United States Patent [19]

Harris

[11] Patent Number: 4,574,667
[45] Date of Patent: Mar. 11, 1986

[54] METHOD FOR CUTTING SHEET METAL

[76] Inventor: Robert E. Harris, 7317 W. 72nd St., Bridgeview, Ill. 60455

[21] Appl. No.: 496,842

[22] Filed: May 23, 1983

[51] Int. Cl.⁴ .............................................. B26D 3/00
[52] U.S. Cl. .......................................... 83/49; 83/439; 83/411 R; 83/442
[58] Field of Search ................. 83/411 R, 439, 442, 83/636, 733, 49; 144/145 R, 145 A, 145 B, 145 C; 30/310

[56] References Cited

U.S. PATENT DOCUMENTS

| | | |
|---|---|---|
| 47,967 | 5/1865 | Low . |
| 1,122,598 | 12/1914 | Holub . |
| 1,426,932 | 8/1922 | Wallace ................................. 83/442 |
| 1,956,912 | 5/1934 | Tate et al. . |
| 2,326,509 | 8/1943 | Womack . |
| 2,394,789 | 2/1946 | Lavoie ................................. 83/733 |
| 2,678,070 | 5/1954 | Davis, Sr. .......................... 144/145 R |
| 2,720,897 | 10/1955 | Kairath ................................ 83/439 |
| 2,754,858 | 7/1956 | Davis, Sr. ............................ 83/442 |
| 2,801,652 | 8/1957 | Meeker, Sr. .......................... 83/733 |
| 3,068,913 | 12/1962 | Hawkins ............................ 144/145 R |
| 3,435,716 | 4/1969 | Sjostrand .......................... 83/411 R |
| 3,768,357 | 10/1973 | McBride ............................. 83/438 |
| 4,047,458 | 9/1977 | Hall .................................... 83/439 |
| 4,244,253 | 1/1981 | Flanigan .......................... 83/411 R |

FOREIGN PATENT DOCUMENTS 1350740 12/1963 France ................................ 83/636

Primary Examiner—Frank T. Yost
Assistant Examiner—Hien H. Phan

[57] ABSTRACT

A sheet metal cutting apparatus with sheet metal cutting member, adjustable guide member and various attachments in a portable embodiment for the mounting of and controlled feeding of a sheet metal workpiece to the cutting member so that desired straight, circular, arcuate and/or combinations of arcuate and straight cuts may be effectuated. A guide bar is disposed laterally from the cutting member and supports the adjustable guide member and the various attachments. The adjustable guide member or any of the various attachments may be selectively positioned and locked along the guide bar at a desired radial distance from the cutting member.

1 Claim, 12 Drawing Figures

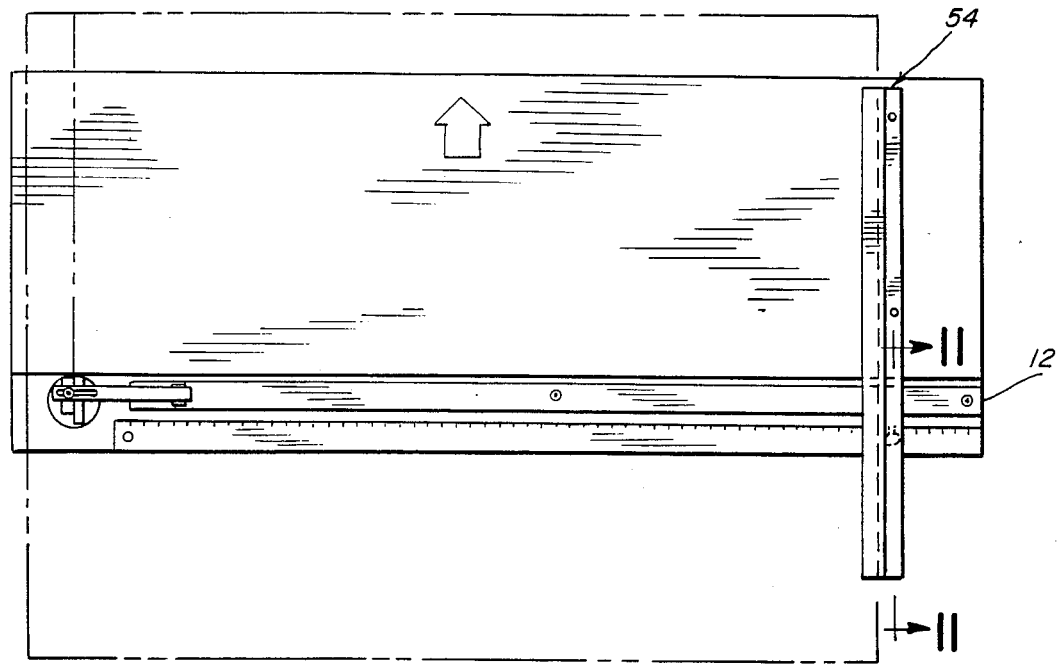
FIG. 10
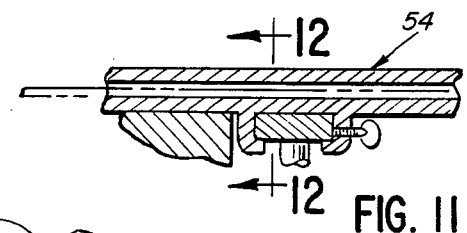
FIG. 11
FIG. 12
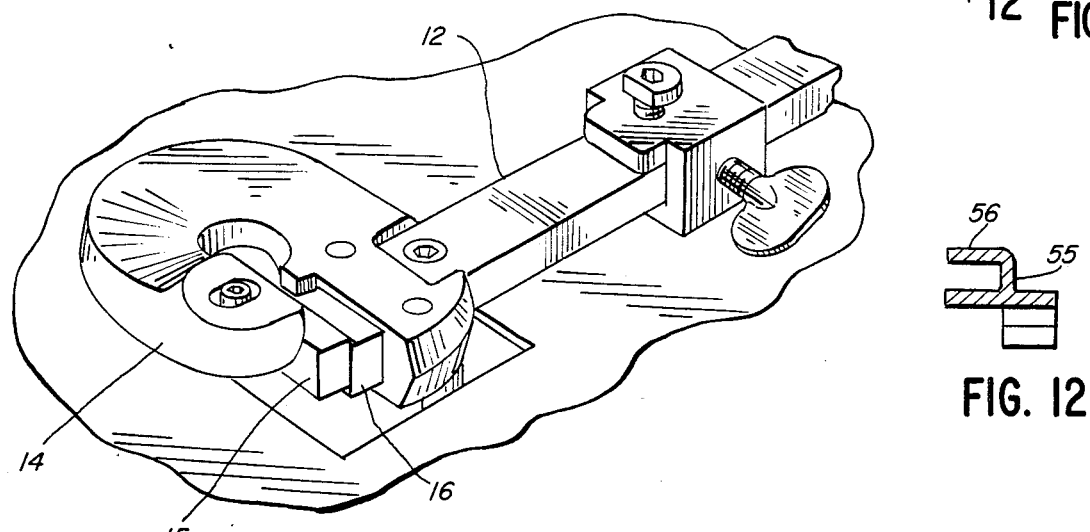
FIG. 9

METHOD FOR CUTTING SHEET METAL

BACKGROUND OF THE INVENTION

Standard sheet metal cutting has heretofore been performed either on large, relatively immobile stationary tools such as table saws, band saws or the like, or using a hand-held cutting instrument.

Stationary tools, because of their size and bulk, are not well suited for many of the arts in which sheet metal cutting plays a vital role. Their immobility makes it unlikely that they will be able to be situated at many locations where cut sheet metal products are to be used. Furthermore, except for heavy gauge metal, large stationary tools such as table saws and band saws are simply not necessary to perform the cutting operation.

Hand-held cutting instruments have provided the advantage of flexibility and allow for use where stationary instruments could not be easily managed. This operation, however, requires the time consuming steps of taking measurements, transposing such measurements to a sheet metal workpiece and manually operating the cutting means to cut the desired shape from the workpiece. Where more than one workpiece is to be cut to the same dimension, each must be transposed with the appropriate measurements and cut individually.

FIELD OF THE INVENTION

This invention relates to the art of controlled cutting of sheet metal workpieces and particularly deals with a portable cutting apparatus with rapidly adjustable attachments which may be fixed at a desired radial distance from the cutting means and upon which sheet metal workpieces may be clamped and guided through a cutting means, so as to effectuate straight, circular, arcuate and/or combinations of arcuate and straight cuts. A particular embodiment of the invention relates to cutting unique sheet metal shapes associated with covering pipe insulation at T-joint intersections.

SUMMARY OF THE INVENTION

According to this invention, a sheet metal cutting means is supported and driven from below a workpiece support surface on a portable apparatus, so that a workpiece may be passed through said cutting means without obstruction. A guide bar is laterally mounted along the workpiece support surface, terminating at one end near the cutting tool. A workpiece guide means including a pivot pin may be selectively positioned at a desired distance from the cutting means along the guide bar and can be locked into place. A sheet metal workpiece is fixed upon the pivot pin and rotated about the pin through the cutting means effectuating a circular cut in the workpiece.

An adjustable attachment for making arcuate cuts may be used in place of the workpiece guide means on the guide bar. It may be selectively positioned and fixed along the guide bar at a desired distance from the cutting means by a slide block which provides a pivot means for the attachment. Clamping means are provided on the attachment to hold a workpiece in place. The attachment is then extendable towards the cutting means to effect an arcuate cut in the workpiece. After making a first arcuate cut, the attachment may be extended again and a second arcuate cut may be made, resulting in an arc-shaped band. Several of these bands may be joined together to form a complete ring. In large ring shapes, construction in this manner eliminates a great deal of waste which would have resulted from cutting a unified ring from a single large piece of sheet metal.

Another attachment may be used in place of the workpiece guide means on the guide bar for cutting a sheet metal segment specifically suited for covering pipe insulation at a T-joint intersection. It may be selectively positioned and fixed along the guide bar at a desired distance from the cutting means by a slide block. A stud projects upward from the slide block and provides both a guide means and a pivot means upon which a flat supporting plate on the attachment may be moved. The flat supporting plate contains a slot comprised of two straight sections set at an oblique angle with respect to each other. The plate is situated so that the stud projects through the slot in the plate. The plate may be moved upon the stud along the path of the straight sections. It may also be rotated on the stud when the plate is situated on the stud at the junction of the two slot sections. A fence is provided on the plate against which a rectangular workpiece is supported and clamping means along the fence hold the workpiece in place. With a workpiece clamped onto the plate, the plate can be guided along the stud by a path defined by the slot in the plate, effectuating a partially straight and partially arcuate path. The workpiece may then be turned over and clamped from the opposite side and a cut symmetrical to the first may be effectuated. The sheet metal piece may be bent to form half the pipe insulation cover for a T-joint intersection.

It is therefore an object of this invention to provide novel cutting apparatus for effecting straight, circular, arcuate, and/or combinations of arcuate and straight cuts in sheet metal.

Another object is to provide cutting apparatus with a rapidly adjustable means for fixing a pivot point a desired radial distance from the cutting means.

A still further object is to provide apparatus for cutting arc-shaped segments which may be joined together to form a ring-shaped member.

An additional specific object of this invention is to provide apparatus for cutting sheet metal in a shape specifically adapted for covering pipe insulation at T-joint intersections.

Other and further objects of this invention will become apparent to those skilled in this art from the detailed description of a preferred embodiment for apparatus for use in accordance with the present invention, reference being had to the accompanying drawings.

BRIEF DESCRIPTION OF THE DRAWINGS

FIG. 9 is an enlarged perspective view illustrating in detail the cutting means and guide bar of the apparatus shown in FIG. 4.

FIG. 10 is top view of a cutting apparatus for sheet metal being shown with a guide fence attachment for making straight line cuts.

FIG. 11 is a cross sectional view of the attachment along the line 11—11.

FIG. 12 is a cross-sectional view of the attachment along the line 12—12.

DETAILED DESCRIPTION OF THE DRAWINGS

Figure 1:
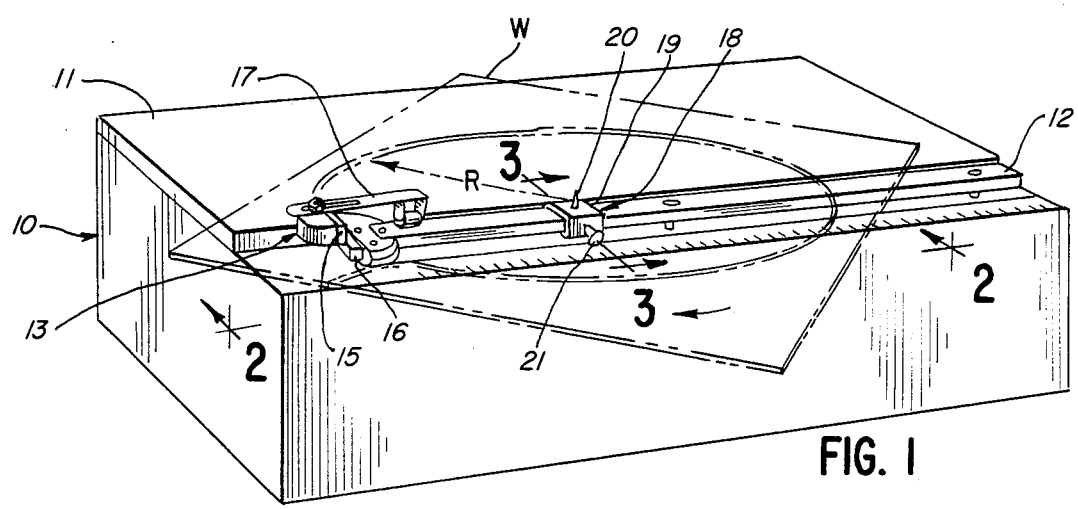
FIG. 1 is a front perspective view of a cutting apparatus for sheet metal embodying the invention and being shown with a workpiece, the cutting path being schematically illustrated by broken lines.
Figure 4:
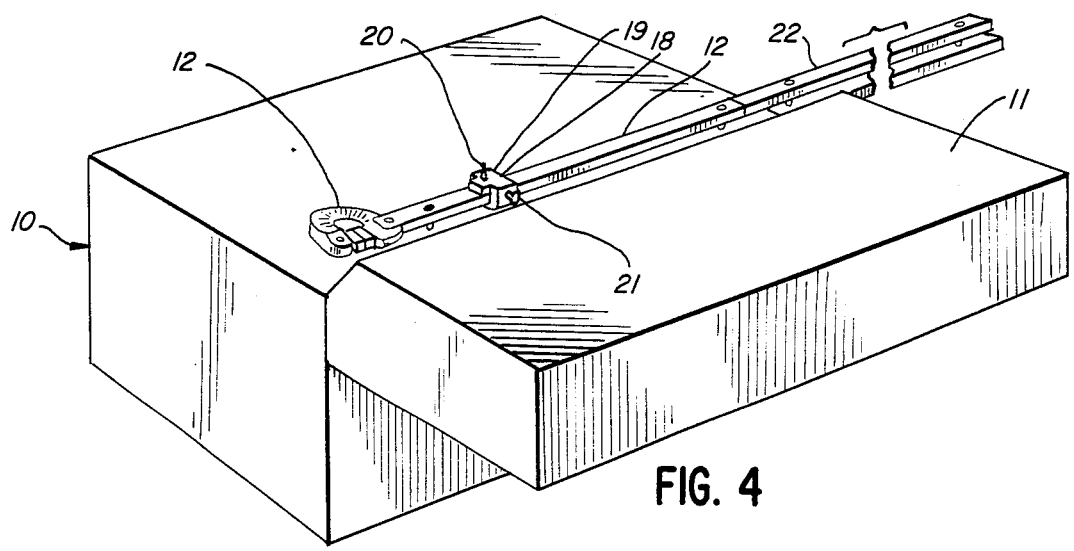
FIG. 4 is a front perspective view of a cutting apparatus for sheet metal embodying the invention being shown with a detachable guide bar section.

In FIGS. 1 and 4, the reference number 10 designates generally a cutting apparatus for sheet metal of this invention shown having a workpiece support surface 11, a cutting means 13 with a guide bar 12 extending laterally from the cutting means level with the support surface.

Workpiece guide means 18 includes a mounting block 19 which fits slideably along guide bar 12 a pivot pin 20 projecting upwardly from the block and a locking screw 21 threaded through the side of the block which may be turned to lock the slideable member against the guide bar. A sheet metal workpiece W is shown in FIG. 1 supported by the workpiece guide member 18 and the workpiece support surface 11.

The cutting means 13 shown in FIG. 1 is particularly suitable for sheet metal cutting. It is comprised of opposable shearing members 15, 16, which cut the sheet metal workpiece in a scissors-like manner as it is fed through the cutting means. Other types of cutting means may be effectively used. In the cutting of heavy gauge sheet metal it may be necessary to use a cutting means with greater cutting strength. It has been found, however, that opposable shearing member type cutters are effective for sheet metal up to 14 gauge.

In the operation of cutting a circular shape from a sheet metal workpiece the operator would selectively position and lock, with locking screw 21 the workpiece guide means 18 along the guide bar 12 at a distance from the cutting means equal to the radius of the desired circular shape. Ruler markings may preferably be indicated on the guide bar or may be indicated on the support surface. Locking screw 21 is threaded through the side of the slideable member.

A sheet metal workpiece W, or if desired a stack of several workpieces, is fixed upon the pivot pin 20, such as by impaling it at a centering point. In FIGS. 1 and 4 the operator's position generally would be such that the cutting means would be to his left as he faced the apparatus, with the guide bar extending laterally to his right. In the embodiment of FIG. 1 when the workpiece is securely in place on the pivot pin it would be supported by the pin and the support surface beyond the guide bar 12 with respect to the operator's position. In the embodiment of FIG. 4, the workpiece would be supported by the pin and the support surface in front of the guide bar with respect to the operator's position. The pivot pin provides a controlled rotation guide means such that when the sheet metal workpiece is in place on the pivot pin the workpiece may be rotated against the opposable shearing members 15, 16 of the cutting means.

The workpiece guide means 18 may be rapidly adjusted to any desired position along the guide bar 12 by merely loosening the locking screw 21, selectively positioning the guide means along the bar and locking it in place. This may be done with a minimum amount of time expended in changing from one desired radius to another.

The embodiment of FIG. 1 shows an optional stabilizing member 17 extending from the cutting means. In operation, the shearing action of the cutting means causes the workpiece to vibrate. The effect of this is greatest when larger workpieces are being cut. The stabilizing member has the effect of dampening this vibration. While it is not shown in FIG. 4., it is to be understood that such a stabilizing member could be used in any embodiment of the invention.

Figure 2:
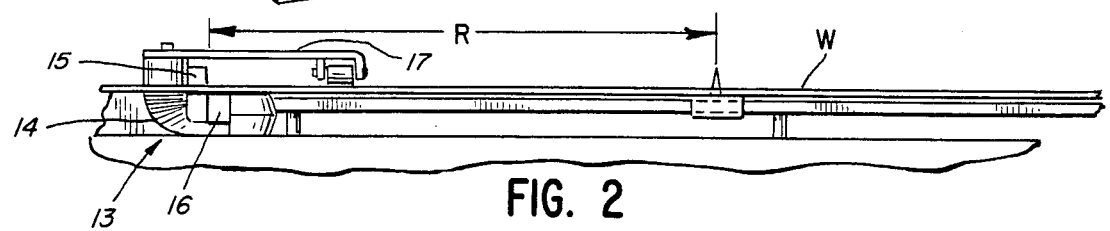
FIG. 2 is an enlarged cross-sectional view along the line 2—2 of FIG. 1.

The disposition and operation of the stabilizing member can best be seen in FIG. 2, which illustrates a cross-section of the invention along line 2—2 of FIG. 1. The upper shearing member 15 is fixed in the shearer casing 14 in a stationary position. The lower shearing member 16 is driven by means disposed below the support surface, and moves against the upper shearing member in a scissors-like motion. Since it is attached to the shearer casing 14 above the stationary shearing member 15, the stabilizing member 17 offers no obstruction to the path of the workpiece as it rotates through the cutting means 13.

Figure 3:
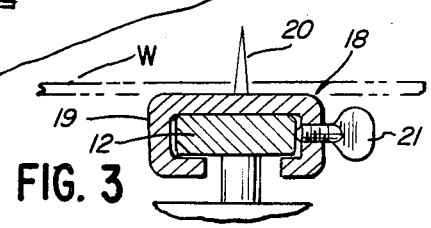
FIG. 3 is an enlarged cross-sectional view along the line 3—3 of FIG. 1.

The disposition and operation of the workpiece guide means 18 can best be seen in FIG. 3, which illustrates a cross-section of the invention along line 3—3 of FIG. 1. Mounting block 19 fits slideably along guide bar 12. Locking screw 21 is threaded through the side of slideable mounting block 19 and may be tightened to lock the workpiece guide means in place along guide bar 12. Pivot pin 20 projects upward, from slideable mounting block 19 and is shown with workpiece W fixed upon it.

The guide bar 12 may be of any desired length as it is not restricted by the size of the workpiece support surface 11. As can be seen in FIG. 4 the guide bar may extend beyond the support surface and may be constructed from detachable sections. In the embodiment shown in FIG. 4 an extension to the guide bar is detachable, offering the specific advantages of being both easily transportable and capable of cutting circular shapes of large radii. FIG. 4 also illustrates a detachable workpiece support surface 11. When the instrument is not in operation the detachable support surface may serve the additional function of a cover for the cutting means 13 and the guide bar 13. The detachable section 22 of the guide bar may be removed and likewise placed under the cover/detachable workpiece support surface.

Figure 5:
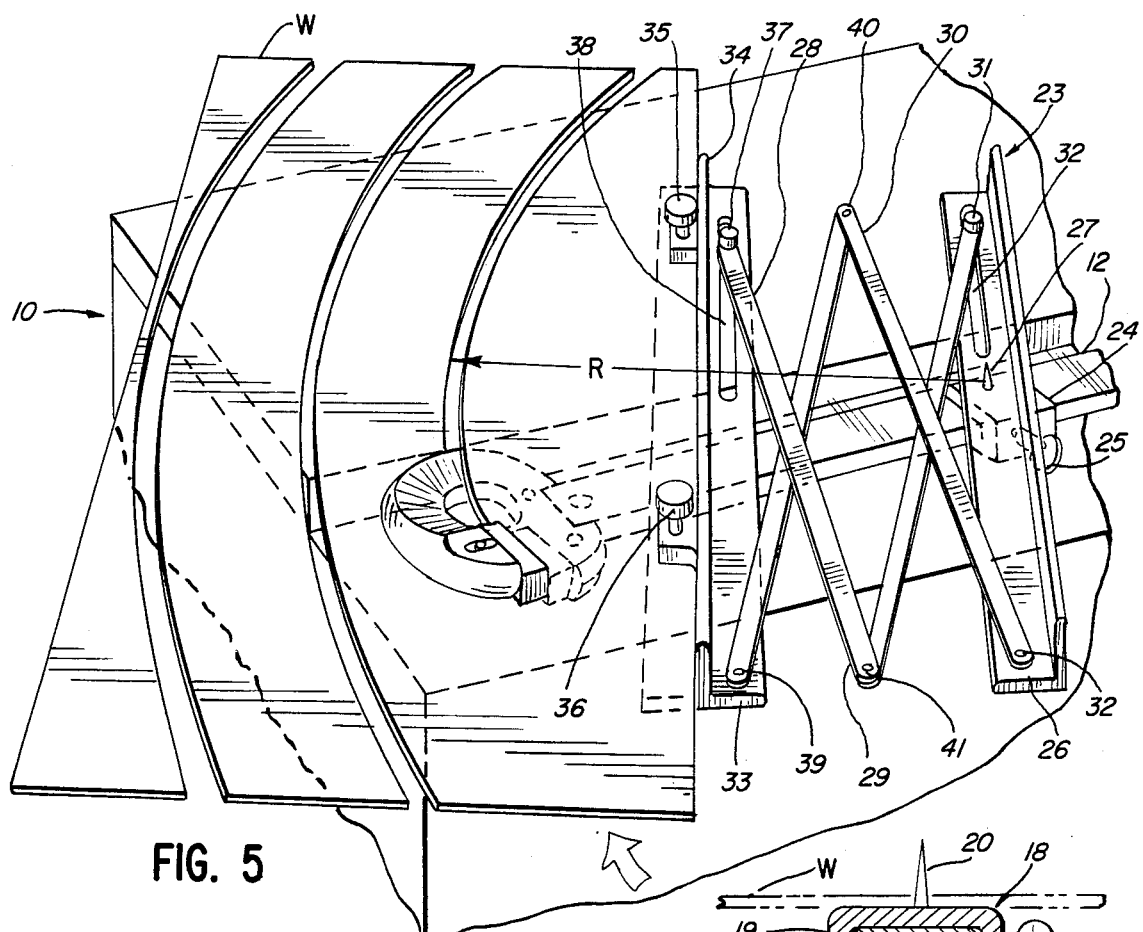
FIG. 5 is an enlarged top perspective view of a cutting apparatus for sheet metal with an expandable clamping attachment embodying the invention.

An adjustable attachment 23 which may be used with the invention to make arcuate cuts is illustrated in FIG. 5. This attachment is particularly well suited for constructing large ring-shaped sheet metal bands. Were one to cut a unitary ring from a single large workpiece the cut-out center piece would be effectively wasted material. The present attachment permits the cutting of arc-shaped segments which may be assembled to form a ring-shaped band.

In operation of this attachment, the workpiece guide means 18 discussed with respect to FIGS. 1 and 4 is removed from the guide bar. Adjustable attachment 23 has a slideable means 24 which is constructed to fit upon the guide bar 12. This slideable means 24 provides the means for selecting a pivot point along the guide bar at a distance from the cutting means 13 equal to the radius of curvature of the desired arcuate cut. Locking screw 25 is threaded through the side of the slideable means 24 which may be turned to lock the slideable means against the guide bar. Upon this slideable means is rotatably fixed a first bar member 26 at point 27. Point 27 provides the pivot point about which the attachment rotates on the slideable means 24.

Attached to this first bar member is an extendable means 28 for radially adjusting the adjustable attachment with respect to the cutting means. Extendable means 28 is comprised of two hinged members 29, 30. The first hinged member 29 is attached to the first bar member 26 by a projecting stud 31 cooperating with a slot 32 defined in the first bar member 26. The second hinged member 30 is rotatably fixed to the opposite end of the first bar member 26 at point 32.

Adjustable attachment 23 also includes a second bar member 33 which supports the sheet metal workpiece. Projecting from this second bar member 33 is a fence 34 against which the sheet metal workpiece rests. Projecting from this fence are clamping members 35, 36 which act to hold the sheet metal workpiece in place. This second bar member 33 is attached to the ends of the two hinged members. The first hinged member 29 is attached to the second bar member 33 by a projecting stud 37 cooperating with a slot 38 defined in the second bar member. The second hinged member is rotatably fixed to the opposite end of the second bar member 33 at point 39.

As can be seen from FIG. 5 the extension and retraction of this attachment acts in an "accordian-like" manner. At any desired extension of the attachment the hinged members may be locked in place by tightening hinge screws 40, 41. This effectively locks the attachment into a rigid support arm at a fixed radius from the pivot point 27. The attachment may then be rotated about the pivot point 27 such that the sheet metal workpiece passes through the cutting means.

The workpiece may then be adjusted with respect to the cutting means by either of two methods. The slideable means 24 of the attachment may be moved along the guide bar toward the cutting means. This will result in a reduction of the radius of curvature to the extent the slideable means is adjusted. Alternatively, the hinged members 29, 30 may be extended relative to the cutting means and relocked in position. As schematically illustrated by the cutting paths in FIG. 5, this will result in the same radius of curvature of an arcuate cut in the workpiece but will be effectuated at a different point along the workpiece.

Figure 6:
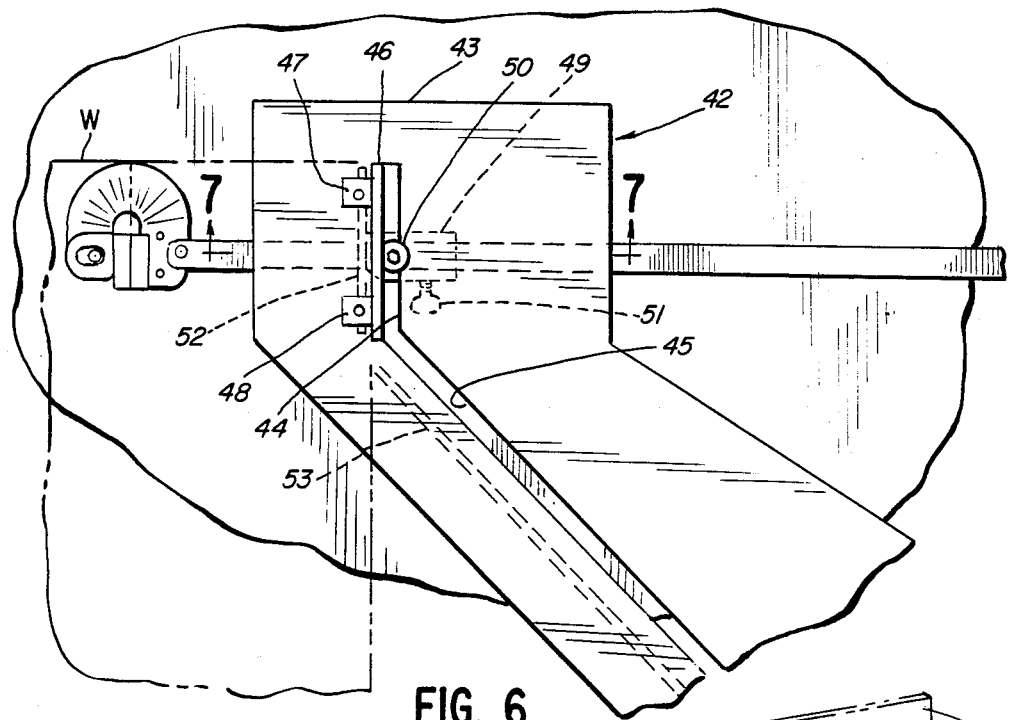
FIG. 6 is a top view of a cutting apparatus for sheet metal being shown with a workpiece, with a guide attachment for cutting workpieces adaptable to covering pipes at T-joint intersections the cutting path being schematically illustrated by broken lines.
Figure 7:
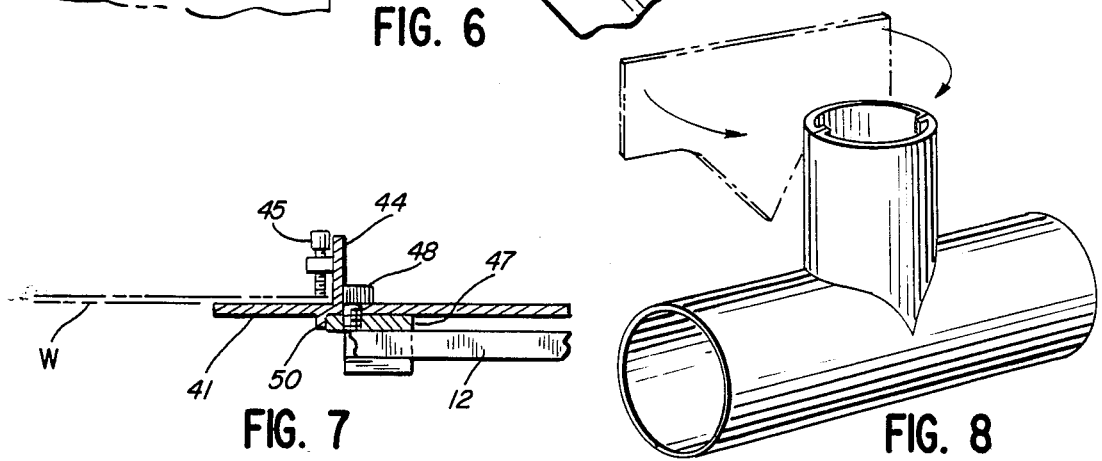
FIG. 7 is an enlarged cross-sectional view of the guide attachment for cutting workpieces adaptable to covering pipes at T-joint intersections shown along line 7—7 of FIG. 6.

Illustrated in FIGS. 6 and 7 is a guide attachment 42 adapted specifically for the cutting of sheet metal pieces to a shape for fitting over pipe insulation at T-joint intersections. The attachment includes a flat plate 43 containing a slot in two sections 44, 45. Parallel to the first slot section 44 is a first fence 46 which provides a support against which a workpiece will rest on the attachment. Clamping means 47, 48 to hold the workpiece in place are provided.

As can best be seen in FIG. 6, guide attachment 42 is provided with a slideable guide means 49 to cooperate with the guide bar 12. Projecting from the guide means is a stud 50. This stud provides the point about which the attachment moves and pivots the workpiece against the cutting means.

In operation a rectangular sheet metal workpiece the length of which is slightly more than half of the circumference of the pipe insulation about which the sheet metal covering will be wrapped is attached to the guide attachment 42. The workpiece is secured to the guide attachment 42 with clamping means 47, 48 such that one of the lengthwise edges of the workpiece is braced by the first fence 46 running parallel to the first slot section 44, and the adjacent widthwise edge is flush with the end of first fence 46. The guide means is secured to the guide bar 12 by means of the locking screw 51 at a point along the guide bar equal to the radius of the pipe insulation to be covered. Starting from the end point of the first slot section 44, the workpiece is guided through the cutting means along the path defined by movement of the supporting plate along the first slot section 44 upon the projecting stud 50. A second fence 52 may be provided on the underside of the supporting plate parallel to the first slot section 44 to facilitate the cutting of a straight line by movement along the first slot section 44. This will result in a short straight cut in the workpiece parallel to the lengthwise edge. At the intersection of the two slot sections, the guide member is rotated, causing an arc-shaped cut in the workpiece. While slight variations are acceptable it has been found that an arc radius of 68° results in the best fitting for the T-joint intersection. The desired arc radius is achieved by maintaining an angle of 112° between the two slot sections. Also a third fence 53 may be provided on the underside of the plate, parallel to the second slot section. When the rotation of the supporting plate 43 about the projecting stud has reached 68° the third fence 53 will contact the side of guide means 49 preventing further rotation. The workpiece may then be guided through the cutting means along a path defined by the movement of the supporting plate along the second slot section 45 upon the projecting stud 50. This will effectively cut away one corner of the rectangular workpiece.

Figure 8:
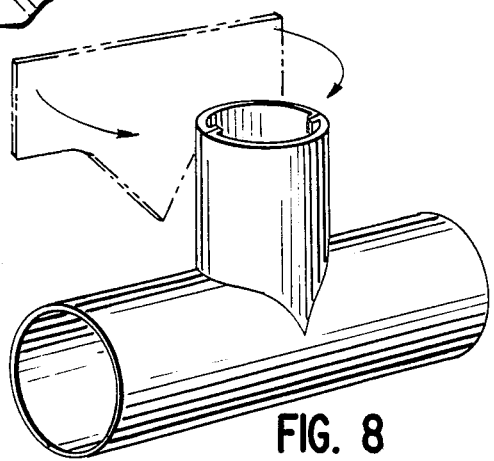
FIG. 8 is a front perspective view of a T-joint pipe intersection being shown with a sheet metal covering prepared using the FIG. 6-7 apparatus, exploded and shown in unbent form.

The second corner is cut away by turning the workpiece over and attaching it to the supporting plate such that the corner adjacent to the cut-out corner on the lengthwise edge of the workpiece is secured on the supporting plate in the same position the cut-out corner occupied. By repeating the same cutting process with the workpiece fixed in this position a symmetrical cut will be effectuated in the workpiece. This workpiece may then be wrapped around a T-joint pipe intersection as illustrated by FIG. 8. Repeating this cutting process with a second rectangular workpiece of the same dimensions would provide a piece to be wrapped aroung the opposite side of the T-joint intersection.

The preferred cutting means is best illustrated by FIG. 9, showing opposable shearing members 15, 16. In the preferred embodiment the top shearing is fixed such that its lower side is approximately flush with the underside of the shearer casing 14. The top side of the casing 14 forms a continuous graduated surface.

In operation, as the workpiece is fed through the opposable shearing members the piece cut away to the outside of the shearers will pass under the casing 14. The piece to the inside of the shearers will ride on top of the casing separated from the outside piece.

FIGS. 10, 11 and 12 illustrate a fence guide attachment 54 for making straight line cuts. The fence guide extends beyond the guide bar 12 in the direction of the operator's position. The purpose of this fence is to support the workpiece so as to reduce vibration occasioned by the movement of the shearers and which becomes problematic when cutting larger workpieces. As can be seen in FIG. 12, the fence guide attachment comprises a vertical projecting member 55 and a horizontal projecting member 56. A workpiece or a stack of several workpieces is moved through the groove defined by these two projecting members.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

Having thus described the invention, what is claimed is:

1. A method for cutting shapes from sheet metal, said shapes being adaptable to cover pipe insulation at a T-joint intersections, utilizing and apparatus including a substantially flat workpiece support surface; a cutting means comprising opposable shearing members supported by means disposed below said support surface and positioned so that the shearing of said workpiece occurs at a point approximately level with said support surface; a guide bar disposed laterally from said cutting means and being approximately level with said support surface; and an attachable member for supporting said workpiece for movement relative to said cutting means, comprising means for selectively fixing a guide point along said guide bar having a projecting stud, a substantially flat plate containing a slot positioned such that said plate may be moved in sliding engagement with said stud, said slot having two straight sections oriented at approximately 112° with respect to each other, at the junction of which said plate may be rotated about said stud, and at least one means for clamping said workpiece to said plate, by the cutting away of a rounded trapezoidal shape from each of two corners from a substantially rectangular sheet metal workpiece, said two corners defining a length wise edge of said rectangular workpiece, comprising the steps of:

(a) fixing said attachable support member to said support guide bar at a distance from the cutting means equal to the radius of the insulated pipe to be covered with said sheet metal;

(b) clamping said workpiece to said attachable support member, such that one of the lengthwise edges of said workpiece is parallel to the first section of said slot;

(c) moving said clamped workpiece against said cutting means to begin cutting same, such that said plate moves along said projecting stud for the length of the first section of said slot;

(d) rotating the workpiece against the cutting means, such that said plate rotates approximately 68° about said projecting stud;

(e) moving the clamped workpiece against the cutting means to continue cutting same, such that said plate moves along said projecting stud for the length of the second section of said slot;

(f) turning said sheet metal workpiece over and reclamping it to said attachable support member, such that the same edge of said workpiece as was initially parallel with said first slot section of said attachable support member is again parallel with said first slot section of said attachable support member;

(g) moving said clamped workpiece against said cutting means to begin cutting same, such that said plate moves along said projecting stud for the length of the first section of said slot;

(h) rotating the workpiece against the cutting means such that said plate rotates approximately 68° about said projecting stud; and (i) moving the clamped workpiece agianst the cutting means to continue cutting same, such that said plate moves along said projecting stud for the length of the second section of said slot.

* * * * *